(12) United States Patent (10) Patent No.: US 7,804,585 B2
Tropf (45) Date of Patent: Sep. 28, 2010

(54) CREATION OF A RANGE IMAGE

(75) Inventor: Hermann Tropf, St. Leon-Rot (DE)

(73) Assignee: VisionTools Bildanalyse Systeme GmbH, Waghaeusel (DE)

( * ) Notice: Subject to any disclaimer, the term of this patent is extended or adjusted under 35 U.S.C. 154(b) by 295 days.

(21) Appl. No.: 12/087,437

(22) PCT Filed: Nov. 3, 2006

(86) PCT No.: PCT/EP2006/010577

§ 371 (c)(1),
(2), (4) Date: Jul. 1, 2008

(87) PCT Pub. No.: WO2007/079805

PCT Pub. Date: Jul. 19, 2008

(65) Prior Publication Data

US 2009/0066929 A1   Mar. 12, 2009

(30) Foreign Application Priority Data

Jan. 8, 2006 (DE) ........................ 10 2006 001 170
Jan. 11, 2006 (DE) ........................ 10 2006 001 634

(51) Int. Cl.
 *G01C 3/00* (2006.01)
 *G01C 3/08* (2006.01)
(52) U.S. Cl. ........................ 356/3.1; 356/4.01
(58) Field of Classification Search ................ 356/3.1, 356/4.01, 4.03, 5.01; 382/106
See application file for complete search history.

(56) References Cited

U.S. PATENT DOCUMENTS 5,675,407 A   10/1997 Geng (Continued)

FOREIGN PATENT DOCUMENTS

JP   61075210 A   4/1986

(Continued)

OTHER PUBLICATIONS

F. Blais, "Review of 20 Years of Range Sensor Development", Journal of Electronic Imaging, 13(1):231-240, Jan. 2004, National Research Council Canada.

(Continued)

*Primary Examiner*—Isam Alsomiri
(74) *Attorney, Agent, or Firm*—Walter A. Hackler

(57) ABSTRACT

The most difficult problem in the creation of a range image with stereo cameras is the establishing of the correspondence of the points. For this, the scene is illuminated twice; thereof at least once with a random or pseudo random pattern. For both cameras, an image is taken for each of the illuminations and the quotient of brightnesses is calculated pixelwise. The correspondence is established on the basis of a comparison of the quotient of pixels on epipolar lines of different cameras. The illumination pattern is preferably highly modulated along the epipolar line; transversally or diagonally to it, it is not or only slightly modulated. For illumination, a projection unit is used which in a preferred arrangement comprises two superposed grating patterns which have a distance (d) to each other, with at least one varying in a pseudo random manner, and with two closely neighboring light sources which shine through the gratings and thereby generate different pseudo random patterns, especially moiré patterns. Applications are found, inter alia, in assembly control, robotics, metrology, archaeology, in the textile industry, in biometry, medicine, reverse engineering.

25 Claims, 15 Drawing Sheets

U.S. PATENT DOCUMENTS

| | | | |
|---|---|---|---|
| 6,028,672 | A | 2/2000 | Geng |
| 6,542,250 | B1 | 4/2003 | Michaelis et al. |
| 6,556,706 | B1 | 4/2003 | Geng |
| 6,600,168 | B1 | 7/2003 | Geng |
| 6,618,123 | B2 | 9/2003 | Uomori et al. |
| 6,897,946 | B2 | 5/2005 | Uomori et al. |
| 7,583,363 | B2 * | 9/2009 | Yuan .................. 356/3.01 |
| 7,729,512 | B2 * | 6/2010 | Nishiyama .............. 382/103 |
| 2006/0215882 | A1 * | 9/2006 | Ando et al. ............. 382/106 |
| 2009/0010495 | A1 * | 1/2009 | Schamp et al. ........... 382/106 |

FOREIGN PATENT DOCUMENTS

WO    WO 2005/010825 A2    2/2005

OTHER PUBLICATIONS

D. Viejo, J.M. Saez, M.A. Cazorla, F. Escolano, "Active Stereo Based Compact Mapping", Proc. of the IEEE/RSJ International Conference on Intelligent Robots and Systems, Alberta, Canada, Aug. 2005, P. 1065-1070.

J. Batlle, E. Mouaddib, J. Salvi, Recent Progress in Coded Structured Light as a Technique to Solve the Correspondence Problem: A Survey Pattern Recognition, vol. 31, No. 7, 1998, p. 963-982.

J. Salvi, J. Pages, J. Batlle, "Pattern Codification Strategies in Structured Light System", Pattern Recognition 37, 2004, pp. 827-849.

Paul J. Best, "Active Optical Range Imaging Sensors", Machine Vision and Applications (1988) 1:127-152.

Yi Ma, Stefano Soatto, Jana Kosecka, S. Shankar Sastry, "An Invitation to 3-D Vision", Springer Verlag 2004, extract (title page, table of contents, p. 110-113, 164-169).

www.3dmd.com/AboutUs/Technology.asp, Jan. 7, 2006, 1 page.

www.3dmd.com/AboutUs/Technology.asp, Jan. 8, 2006, 2 pages.

www.3dmd.com/AboutUs/Technology.asp, Jan. 12, 2006, 1 page.

\* cited by examiner

3rd line

CREATION OF A RANGE IMAGE

BACKGROUND OF THE INVENTION

The invention relates to a method and a device for the acquisition of a range image. In contrast to conventional images which code gray scales or colors, range images code the distance of object points from the sensor (usually a camera) or the height of the object points relative to a plane. The pixels of a range image thus comprise range information (e.g. distance or height) of each corresponding imaged object point. Technical applications are found, inter alia, in assembly control, in robotics, metrology, archeology, in the textile industry, in biometrics, medicine and reverse engineering.

An overview of the methods used as well as a table of commercially available systems are found in the literature reference "Review of 20 years of range sensor development", Journal of Electronic Imaging, 13 (1): 231-240, January 2004, National Research Council Canada. For more information about the methods, see also Paul J. Besl, "Active Optical Range Imaging sensors, Machine Vision and Applications" (1988) 1:127-152.

The method described in this application relates to the triangulation with stereo cameras for the contact-free acquisition of a range image. Conventional stereo systems use two or more video cameras which are rigidly connected with each other and observe the same scene. With stereo methods, the most difficult problem is to establish the correspondence between the pixels, i.e. to allocate the pixels of the one camera to the pixels of the other camera. When the correspondence is known, a corresponding range image can be calculated according to known mathematical methods (see e.g. Yi Ma, Stefano Soatto, Jana Kosecka, S. Shankar Sastry: "An Invitation to 3D", Springer Verlag 2004).

To establish correspondence, classic image analysis methods are used on the basis of the extraction of contour-like or blob-like features; however, due to possible problems in the extraction of features, an allocation found is not really certain; in addition, it must be estimated or interpolated between the features. To circumvent these problems, structured light is additionally used.

With regularly repeating light structures, such as the widespread strip patterns, ambiguities will occur which can be eliminated by the coded light approach. Usually, a single camera is used here, with the geometry of the light source itself used for the triangulation. An overview of known techniques is provided by the literature reference J. Battle, E. Mouaddib, J. Salvi: "Recent Progress in Coded Structured Light as a Technique to Solve the Correspondence Problem—A Survey". Pattern Recognition, Vol. 31, No. 7, p. 963-982, 1998.

The publication WO 2005/010825 A2 discloses a method for the acquisition of a range image in which a first illumination of the scene (object) is performed with a random pattern (random grid) and a second illumination with a so-called "striped grid". A first and a second image is taken by two cameras each. In a first step after taking the first images with both cameras, the correspondence between the coordinates of the two first images is determined. After the second images are taken, the correspondence established in the first step is used to identify pattern strips between the two second images of the scene. Finally, the scene's 3D coordinates are determined for example by means of triangulation. Brightness ratios from the first and the second image are not calculated for both cameras, and no correspondence of pixels will be performed on the basis of a comparison of the brightness ratios.

In J. Salvi, J. Pagès, J. Battle, "Pattern codification strategies in structured light system", Pattern Recognition 37, 2004, pages 827-849, it was proposed to use one camera to take a plurality of images of one scene with different illumination patterns and to subsequently calculate for each image the brightness ratio (intensity ratio) relative to constant illumination. However, no random or pseudo random patterns are used, and there is also no indication for the comparison of brightness ratios of the images taken by two cameras.

According to U.S. Pat. No. 6,542,250 B1, at least two patterns are used which can be random patterns. On the basis of an initial estimation, an iterative process realizes, point by point, a forward calculation of spatial coordinates to image coordinates of two cameras, with a refinement in every iterative step.

It is also known to work with individual textured illumination patterns and textured element-wise correspondence determination, e.g. with the systems of companies 3Q/3DMD (see http://www.3dmd.com/AboutUs/Technology.asp). This has the disadvantage that the textured elements can appear differently from different angles of view (sheen, shading, form). As such, they are difficult to analyze and thus may provide uncertain results. Consequently, these methods are only used on not excessively structured surfaces with a broad reflection club (mat surfaces). According to D. Viejo, J. M. Sa'z, M. A. Cazorla, F. Escolano: "Active Stereo Based Compact Mapping. Proc. of the IEEE/RSJ Intern. Conf. on Intell. Robots and Systems", Canada, August 2005, the problem is eased by a specifically selected form of the features, namely by line elements of randomly changing brightness and orientation; only elements of matching orientation and brightness may be paired with each other. It is disadvantageous in this respect that a) the brightness differs viewed from different directions and that b) these zo elements must have a certain expansion for a reliable analysis, which is why the acquisition of a pixel-wise correspondence again requires interpolation between the features.

According to J. Battle, E. Mouaddib, J. Salvi: "Recent Progress in Coded Structured Light as a Technique to Solve the Correspondence Problem. A Survey". Pattern Recognition, Vol. 31, No. 7, p. 963-982, 1998, p. 841-842, paragraph 5.1, one camera is used to take a plurality of images of one scene with different illumination patterns in each case. Subsequently, the corresponding brightness ratio (intensity ratio) is calculated for each image in relation to a constant illumination (codification based on grey levels).

A special form of coded light is the coding by means of a color pattern continuously running over the field of vision ("rainbow"), with an individual camera, according to JP 61075210 or U.S. Pat. No. 5,675,407. One problem here is the high price for the projector which is realized e.g. by means of a linear variable wavelength filter.

According to U.S. Pat. No. 6,028,672, with continuously running color patterns, the triangulation does not take place between camera and projector, but between two cameras, with a color comparison on epipolar lines of the two cameras. It actually eases the requirement of a geometrically precise color projection, because random color patterns can thus be used; however, basic problems will remain with the color analysis.

According to U.S. Pat. No. 6,556,706, these problems are to be reduced by means of various measures, among others by means of a light projection containing, sheet wise, only the light of one wavelength (see e.g. column 5, line 35 " . . . impose a single spectral light condition to the projector").

The same applicant also proposed arrangements with a rotating laser light slot (see U.S. Pat. No. 6,600,168), with one camera, with the light brightness changing depending on the angle, increasing for one image capture and decreasing for another image capture (hereinafter called "countercurrent"). Via the brightness ratio of a pixel from the images, an unambiguous allocation to the corresponding angle of projection can be obtained. Disadvantageous are the mechanical movement and the required precision in the projection.

A static arrangement for creating countercurrent illumination patterns over the field of vision, with one camera, is described in U.S. Pat. No. 6,897,946, generated by two closely neighboring lamps slightly turned away from each other, with reflectors.

Another device for the creation of countercurrent illumination patterns over the field of vision is described in U.S. Pat. No. 6,618,123, with a field of LEDs which are controlled such that countercurrent illumination patterns develop over the field of vision. The device operates with a single camera and requires homogeneous light beams and an elaborate calibration with a planar plate.

A general disadvantage of methods with continuous, countercurrent illumination patterns over the field of vision is the fact that—with a planar base—the brightness values of neighboring pixels differ only slightly and a precise local allocation is therefore difficult.

To achieve, nonetheless, good allocation (and thus a good range measurement), high-resolution precision transducers must be used. In order to utilize well the illumination dynamics with low brightness values and to be able to analyze well even dark surface sections, the ratio has to be calculated by means of a division by small numbers; accordingly, even with small numbers, adequately significant bits must be available. When two cameras are used, they must be precisely matched with each other.

Taking this state of the art into account, it is an object of the invention to provide a method and a device which avoid the above-mentioned disadvantages.

SUMMARY OF THE INVENTION

In accordance with the invention, the problem is solved by methods and devices with the features of the enclosed independent patent claims. Preferred embodiments and further developments of the invention result from the dependent patent claims and the following description with the accompanying drawings.

A method according to the invention for the acquisition of a range image of a scene from the correspondence of pixels of the images of a first camera and at least one second camera, which cameras record the scene in stereo arrangement, is thus characterized in that the scene is illuminated in a first illumination with a random or pseudo random pattern which is designed, with regard to at least one modulation feature in at least one spatial dimension, as a random sequence or, respectively, pseudo random sequence;

in the first illumination, a first image is taken by at least two cameras;

in a second illumination, the scene is illuminated, wherein a second image with the second illumination is taken by the at least two cameras;

for at least two cameras, a ratio is calculated pixel-wise from the first and the second image taken by the corresponding camera, in which a modulation feature value of the pixel from the one image is placed in the numerator, and the modulation feature from the other image is placed in the denominator of the ratio value; and the correspondence of pixels of the scene is determined on the basis of a comparison of the modulation feature ratios of pixels from different cameras.

A device according to the invention for the acquisition of a range image of a scene, the device comprising at least two cameras in stereo arrangement, at least one image analysis unit for analyzing the camera pictures and at least one projection unit for illuminating the scene, is characterized in that by means of the projection unit, at least two different illuminations can be projected onto the scene, of which at least one illumination is a random or pseudo random pattern which is designed, with regard to at least one modulation feature in at least one spatial dimension, as a random sequence or, respectively, pseudo random sequence;

in the first illumination, a first image can be taken by at least two cameras;

in a second illumination, the scene can be illuminated, wherein a second image with the second illumination can be taken by the at least two cameras;

for at least two cameras, a ratio can be calculated pixel-wise with the image analysis unit from the first and the second image taken by the corresponding camera, in which a modulation feature value of the pixel from the one image is placed in the numerator and the modulation feature from the other image is placed in the denominator of the ratio value; and the correspondence of pixels of the scene can be determined on the basis of a comparison of the modulation feature ratios of pixels from different cameras.

Random or pseudo random patterns are hereinafter also called random patterns for short. Pseudo random patterns also subsume determined patterns (quasi random patterns) which, seen over a minimum length, do not show any repetitions within a certain local area.

Random patterns are based on a random sequence as described in the next paragraph. Pseudo random patterns are based either on a pseudo random sequence, as described in the paragraph after next, or on a sequence with specific properties, called "quasi random sequence" which is described thereafter.

Random patterns and pseudo random patterns are present in a grid which is preferably somewhat coarser than the pixel grid (as coarse as necessary to avoid aliasing effects), simply called "grid" hereinafter.

A random sequence results from the repeated application of a statistical experiment. A random sequence generally is a succession of realizations of a random variable. The term is mostly used in the sense of a succession of characters randomly selected from a specific alphabet or set of numbers. A true random sequence can be approximately characterized by a vanishing serial correlation or also autocorrelation, i.e. the correlation coefficient between consecutive values in the sequence is not significantly different from zero.

Pseudo random sequences is the term for sequences—for example number sequences—which actually look random, at least for sufficiently short sequences, but, in fact, are not random. A pseudo random sequence "looks random" but it is calculated or generated by a deterministic algorithm (e.g. pseudo random number generator). Randomness is determined by statistical properties of the numerical sequence, such as the equiprobability of individual numbers and the statistical independence of different numbers of the sequence.

For example, by means of a pseudo random number generator, a sequence of pseudo random numbers is calculated by means of deterministic algorithms starting from a genuinely randomly selected starting value.

The following numeric example is used to explain a pseudo random sequence:

00102113302002213200102113302002213200102
11 . . . .

The presented sequence of numbers with the values 0, 1, 2, 3 (generated by a digital pseudo random generator) is repeated after a minimum length of 18 values (marked by underscores); however, there are no repetitions of local areas of the length 3 (or more).

A quasi random sequence is a sequence of values specifically construed for the purposes of this invention; within the scope of this explanation, they will be designated as "numerical values". The constructed quasi random sequence serves to facilitate the finding of the correspondence and to render this as safe as possible.

A quasi random sequence may be periodic; however, the periodic length—taking into account the imaging conditions—must be at least as large as is equivalent to the maximum possible disparity of corresponding points on lines, preferably on epipolar lines. In the following, such a period is called a rough period. Additionally, consecutive values must meet certain conditions which are explained in the following and illustrated on the basis of FIG. 15. According to the rules described, quasi random sequences can be created by means of a computer program.

For the purpose of illustration by examples, the following numerical values 1 to 9 are used (1 for a small numerical value; 9 for a large numerical value). The sequences of numerical values are to be interpreted e.g. as gray values along epipolar lines, in a grid. The numerical values can also be designated abstractly by a, b, c, . . . , in cases where this is more advantageous for the presentation, e.g. acbcab for 124214.

FIG. 15*a* shows one example with a constant disparity of two grid units along the epipolar lines, e.g. the numerical values according to FIG. 15*a*, the arrows indicating corresponding points. The appropriate height profile (with cameras aligned in parallel) is equivalent to a constant height. Hence, with disparity skips, there will be discontinuities in the height profile. FIG. 15*b* shows such a disparity skip at the position marked "X".

In the presented example, the individual values of the two cameras are exactly equal; the correspondences (arrows) can be unambiguously determined. This is also the case when the values are not exactly equal but only nearly equal; to simplify the presentation, the following is based on exactly equal values.

Depending on the situation, it can be absolutely harmless if the sequence of numerical values within the rough period comprises additional smaller periodicities, as shown in the example of FIG. 15*c*. Yet, despite the periodic area P, the allocation is unambiguous since the periodic area is framed on both sides by a period-free sequence and the periodic area P has the same length for both cameras. If there is, however, a disparity skip within the periodic area P, the allocation becomes ambiguous, see FIG. 15*d*.

A similar situation is presented in the example according to FIG. 15*e*. The partial sequence "abcdef" is repeated after 15 steps (camera 1). In the lower sequence (camera 2), eleven values have been removed at the position marked "X". Here, the allocation is highly ambiguous.

Repetitions should thus be avoided as far as possible. However, there are natural limits to it, especially for shorter value sequences: With four quantization steps, for example with the four possible gray values 1, 2, 3, 4, there are only 4×4 possible partial sequences of the length L=2; when these sequences are exhausted, repetitions of partial sequences of this length must principally occur thereafter. There are 4×4×4 possible partial sequences of length 3, etc. Accordingly, with an increasing partial sequence length L, more rigid demands can be made.

A quasi random sequence now is a sequence of numerical values which avoids—within the rough period—any exact or approximate repetition of partial sequences as far as this is possible within the scope of a meaningful quantization preset by the overall system.

Although systematically constructed, a quasi random sequence usually has a random appearance at first glance. "Approximate" would be true for example if "1 9 1 9 1 9" in FIG. 15*d* were replaced by "1 9 1 8 2 9", such small deviations being in their amplitude somewhat above the system noise (including the camera).

Moreover, it is to be endeavored that even two directly neighboring values differ in the best possible way; consecutive identical values are formally equivalent to a partial sequence of length 1 in the quasi random sequence.

Within the scope of this application, a random pattern or, respectively, a pseudo random pattern is understood to be a two-dimensional structure which has at least one modulation feature, e.g. intensity/brightness, color or, respectively, a color parameter such as color intensity or color saturation, polarization, phase, frequency etc. This modulation feature is formed in the pattern in at least one spatial dimension as a random sequence or, respectively, a pseudo random sequence, i.e. with regard to the modulation feature, the pattern is locally modulated in at least one spatial dimension in the form of a random sequence or, respectively, a pseudo random sequence. A preferred embodiment may consist of the random or, respectively, pseudo random pattern being essentially locally modulated in a first spatial dimension and essentially not or only slightly modulated in the second spatial dimension. If the pattern is not or only slightly modulated in the second spatial dimension, this is considered a strip pattern or, respectively, a pattern with a strip-like structure.

In preferred embodiments of a random pattern or, respectively, a pseudo random pattern, the modulation feature is the brightness or, respectively, the intensity of the illumination, and the modulation feature ratio is a brightness or, respectively, intensity ratio, or the modulation feature is a color parameter of the illumination and the modulation feature ratio is a color value ratio. Basically, the random or, respectively, pseudo random sequence can also be a binary sequence, i.e. a sequence with two conditions of the modulated feature, preferably a sequence of light/dark values. Without limiting the general nature, the invention will be exemplarily explained in the following on the basis of an intensity or, respectively, brightness pattern (gray values or light/dark).

The pattern can be randomly planar. A strip-shaped pattern, i.e. a pattern with a strip structure, is preferred. Preferably, the strips in the image taken by the cameras are essentially oriented transversely or diagonally to the epipolar lines. As a consequence the pattern is essentially modulated along the epipolar lines and is not or only slightly modulated transversely or, respectively, diagonally thereto.

The special advantage of the diagonal projection strips is explained on the basis of FIG. 16. FIG. 16*a* again shows the situation of FIG. 15*a* with constant parity. FIG. 16*b* shows sequences of numerical values at 0 disparity—for ease of reading presented by letters a to g; the period of the sequence is 7, with a=1, b=4, c=3 etc. applicable for example.

FIG. 16*c* shows the same sequence; however, with two disparity skips by +4 or, respectively, −4 increments. At the discontinuity points, the numerical values c,d/e,f are removed or, respectively, numerical values xy/xz are inserted. At these points, there are to be steep skips in the object's height profile;

the removed values correspond to places which the corresponding camera cannot see ("shading"), the inserted values correspond to brightnesses which are visible at the edges of the height profile for the camera in question. This characteristic course may now apply to one first epipolar line, here called "1$^{st}$ line" for short.

FIG. 16d shows a neighboring, i.e. not too far away located epipolar line, here called 2$^{nd}$ line, namely for diagonal projection strips. The diagonal projection strips result in a shift of the complete pattern—in the example by two increments to the right. The position of the disparity skips is, however, maintained, at least approximately.

The third line in FIG. 16e shows a shift by another two increments, again maintaining the position of the parity skips.

The special advantage of the diagonal projection strips is apparent from this example: The same parity skip information (and thus height skip information for an object point)—i.e. the same reference arrows—is derived from the allocation of different numerical values originating from neighboring or nearby epipolar lines. For example, allocation e-e in FIG. 16c becomes the allocation c-c in FIG. 16d. The analysis will be considerably more stable by including—in the analysis of the image information for creation of the range image—allocations of values which differ from each other and belong to nearly the same object point but come from different epipolar lines which are neighboring or arranged closely to each other.

This inclusion is made possible by projection strips running diagonally to the epipolar lines. If, on the contrary, the projection strips were not diagonal but perpendicular to the epipolar lines, FIG. 16d would result in the same numerical values as FIG. 16c (i.e. the allocation e-e in FIG. 16c would remain an allocation e-e in FIG. 16d) so that no redundant information or additional information is gained which could be taken into account in the analysis.

Of course, the position of the parity skips does not remain the same over all lines; yet, rough changes of the parity skip positions from line to line will occur only occasionally. According to the invention, local analyses are therefore considered in combination with those of precursor lines on the one hand and follower lines on the other hand, and the result of those neighbors with the more plausible result will be selected, preferably averaged.

Even without the above-described ratio formation according to the invention, the advantage of the diagonal arrangement of the projection strips relative to the epipolar lines is given, even if only one illumination is performed. A general second method according to the invention—developed in accordance with a second independent aspect of the invention—for creating a range image of a scene from the correspondence of pixels of the images of a first camera and at least one second camera, which cameras record the scene in stereo arrangement, is thus characterized in that in a first illumination, the scene is illuminated with a random or pseudo random pattern which is designed, with regard to at least one modulation feature in at least one spatial dimension, as a random sequence or, respectively, pseudo random sequence;

in the first spatial dimension, the random or, respectively, pseudo random pattern is essentially locally modulated, whereas in the second spatial dimension, it is essentially not or only slightly modulated;

the second spatial dimension of the random or, respectively, pseudo random pattern is aligned diagonally to the epipolar lines;

in the first illumination, a first image is taken by at least two cameras;

the comparison of the modulation features is performed on allocated epipolar lines of different cameras; and the correspondence of pixels of the scene is determined on the basis of a comparison of the modulation features of pixels from different cameras.

A general device, designed in accordance with this second independent aspect of the invention, for creating a range image of a scene, comprising at least two cameras in stereo arrangement, at least one image analysis unit for analyzing the camera pictures and at least one projection unit for illumination of the scene, consequently comprises the features that by means of the projection unit, a first illumination can be projected onto the scene, designed as a random or pseudo random pattern which is designed, with regard to at least one modulation feature in at least one spatial dimension, as a random sequence or, respectively, pseudo random sequence;

in the first spatial dimension, the random or, respectively, pseudo random pattern is essentially locally modulated, whereas in the second spatial dimension, it is essentially not or only slightly modulated;

the second spatial dimension of the random or, respectively, pseudo random pattern is aligned diagonally to the epipolar lines;

in the first illumination, a first image can be taken by at least two cameras; and the correspondence of pixels of the scene is determined on the basis of a comparison of the modulation features of pixels from different cameras.

The other embodiments of a method or a device in accordance with this aspect of the second independent invention, i.e. the diagonal arrangement of projection strips, can be provided in accordance with one or more different advantageous, additional features of the first invention relating to the ratio formation. The following description further explains the first invention relating to the ratio formation.

Preferred embodiments can be characterized in that they use—for the second illumination—a homogeneous illumination, a random or pseudo random pattern similar to the first illumination, or, preferably, a random or pseudo random pattern different from the first illumination. According to another advantageous feature, it is proposed to compare the modulation feature ratios on allocated epipolar lines of different cameras. In another advantageous embodiment, correspondence may be obtained by a comparison of the values of a piecewise, one-dimensional, standardized correlation of the modulation feature ratios along the epipolar lines. In yet another, especially advantageous, further development the random or, respectively, pseudo random pattern may be essentially locally modulated in a first spatial dimension and essentially not modulated or only slightly modulated in the second spatial dimension, with the random or, respectively, pseudo random pattern essentially being modulated along the epipolar lines.

When forming the modulation feature ratio in preferred embodiments, an offset value g can be added to or subtracted from the modulation features set in a ratio. Thus, brightness ratio means the mathematical ratio of two brightnesses h1 and h2, thus $h1/h2$ or $h2/h1$, or another ratio formation in this sense, e.g. $(h1-g1)/(h2-g2)$, $(h1+g1)/(h2-g2)$, $(h1-g1)/(h2+g2)$, $(h1+g1)/(h2+g2)$. Here, g1 and g2 can be the same or different. The addition or subtraction of the values g1 and/or g2 can be used, for example, to take into account a previously measured basic brightness at ambient light; in this case, g1 and/or g2 are preferably these basic intensities; or they can be used to avoid the division by zero or by very small values.

Especially preferably, the illumination of the two images is done with the same or at least approximately same solid angle. This will ensure that the ratio of two measured brightness values is only determined by the projection of the pattern and independent of the color, the brightness, the surface roughness and the surface inclination of the object and, especially important, independent of the viewing angle. Hence, the ratio is the same for both cameras.

For example, it is known from 2D metrology with image processing that, for reasons of illumination engineering, workpiece edges can provide different measuring results depending on the shaping (rounding, chamfer . . . ). Independence from the surface inclination eliminates such problems here.

The insensitivity of the method according to the invention versus surface properties results from the following consideration. Seeing it from the position of an object point which is positioned on a dark strip when taking the first image, and on a light strip of a projected strip pattern when taking the second image, the point will "see" each time the same light source, thus the same distribution in the same solid angle. When the object is inclined to the right, more reflected light will actually fall into the right camera than into the left one; yet, for both cameras, the quotient of both gray values will be exactly the same at the object point. This is also independent of the surface properties.

Preferably, not only one but at least two random or pseudo random patterns are worked with; depending on the technical approach (see below), such embodiments are easier to realize and also provide more significant measuring results (greater local structuring after ratio formation).

Mathematical correspondence can be established as shown in the above mentioned U.S. Pat. No. 6,028,672; however, in contrast thereto, this is not done on the basis of a comparison of colors of a color profile extending over the field of vision, but on the basis of the comparison of the brightness ratios (quotient) of pixels of the two images with different patterns or, respectively, random patterns.

In finding correspondence, the above described problem of the precise adjusting of the cameras to each other will not apply any more when not only the ratios of the brightness values are compared but the local profiles of the ratios of the brightness values are compared to each other. This can be realized, for example, by piecewise standardized one-dimensional correlation along the epipolar lines. If the orientation of two cameras to each other and the image of an object point on a pixel in the image plane of the one camera are known, the position of the homologous image point in the other image plane will be limited to one line. This line is called the "epipolar line". This line results geometrically when the epipolar plane—which is formed of the object point and the two projection centers—is intersected with the image planes.

As soon as correspondence is established, the range image can be calculated in accordance with known methods (see e.g. Yi Ma, Stefano Soatto, Jana Kosecka, S. Shankar Sastry: "An Invitation to 3D", Springer Verlag 2004 or the above-mentioned U.S. Pat. No. 6,028,672).

Except in rarely occurring special cases, an unambiguous correspondence determination for non-binary random patterns is principally possible, either pixel wise and, by means of interpolation, even subpixelwise.

The solution according to the invention avoids the above-cited problems with color analysis according to U.S. Pat. No. 6,028,672 and U.S. Pat. No. 6,556,706 and with the above-described general disadvantage of methods with continuous countercurrent illumination patterns over the field of vision. The random patterns may have a locally high contrast. The invention is based on the finding that a locally continuous course—as proposed until now—is not required. It is sufficient if—with corresponding points—the course of the above-mentioned ratio of the brightness values (generally the modulation feature) is locally the same or even only similar. The only condition is that too long repeating courses of ratios may not occur in order to avoid ambiguities. This can be excluded with pseudo random patterns; with random patterns, it is improbable due to the random nature. If such cases should, nonetheless, occasionally occur, this can be just about excluded by repeating the image with at least one additional random or, respectively, pseudo random pattern.

For textured illumination samples with textured element-wise correspondence determination, the above-described problems can be avoided by means of pixelwise working and ratio calculation; an image analysis for determining the position of the textured elements is not necessary.

On the other hand, exactly because of the texture-like random pattern, with pixelwise ratio calculation, the above-mentioned problem of countercurrent illumination samples (wedge samples) via the field of vision will be prevented, so that with a plane object surface, the brightness values of neighboring pixels will differ only slightly; due to the random nature, this can only be the case for individual pixels or very few pixels lying right next to each other.

The method can advantageously be repeatedly realized with different illumination units, each consisting of one or several projection units, with a fusion of the images or, respectively, the results or the intermediate results, locally or globally, on the basis of safety values (by means of the image analysis logic, e.g. on the basis of contrast, taking no account of results from brightness-overloaded regions) or based on averaging or majority decisions. A particularly practice-relevant advantage in this context is the automatic suppression of local signal saturation upon local glancing (the glancing angle condition is met for only one of the illumination units).

In the sense of the claims, "pixel wise" means that for each camera the brightnesses (or, respectively, generally the modulation feature) of pixels (picture points) of the same (or at least approximately the same) image coordinates are set into a ratio. Local averaging may be useful, e.g. for subpixel algorithms, or a systematic small offset may prove to be necessary. For dynamic scenes, e.g. with moving workpieces, offset pixels are to be set in the ratio according to the shift vector field (in the image area). In simple cases (known workpiece shift, e.g. on conveyor belt, long focal length view, minor height differences), the shift vector field is known a priori. However, with smaller focal length and increasing differences in height, the shift vector field increasingly depends on the final result, the level of the object points. It is expected that the vicious circle can be broken with iterative methods and suitable heuristics, e.g. by estimating the shift vector field with increasing precision, optimization with a quality measure from a mean depth variation to be minimized and a similarity to be maximized of corresponding ratio values. That may be mathematically challenging but does not present any basically insoluble problem.

Technically, random patterns can be realized for example by the use of a beamer (micro-mirror array) for the programmable projection of random or pseudo random patterns.

A two-camera stereo arrangement can also be realized, of course, with a single camera in different positions, e.g. on a robotic arm.

Of course, the method also concerns arrangements with more than two cameras, with stereo analysis between the camera pairs or with a fusion of the results on the basis of safety values (e.g. on the basis of contrast, taking no account of the results of brightness-overloaded regions) or majority decisions.

The described procedure can, of course, also be realized repeatedly at different positions relative to the object surface, e.g. with the object or with cameras and, if necessary, by illumination on a robotic arm, with subsequent fusion of the results.

The methods here described can, of course, also be used for a combination of range images with gray scale images or colored images. This is standard, for example, with body scanners for the purposes of visualization.

Of course, the analysis unit can be integrated into the camera(s).

Advantageous additional features of devices according to the invention which are explained in more detail in the Figures can generally be described as follows:

At least two illuminations can be performed with a random or pseudo random pattern.

At least one random or pseudo random pattern is a brightness pattern.

A projection unit is provided with two superimposed gratings which are at a distance to each other, wherein at least one grating has a random or pseudo random structure, and an illumination with at least two light sources which shine through the gratings or can illuminate them and thereby provide different patterns.

A projection unit is provided with two superimposed gratings which are at a distance to each other, wherein with at least one grating, the phase and/or the frequency of the grating varies in a pseudo random manner, and an illumination with at least two light sources which shine through the gratings or can illuminate them and thereby provide different moiré patterns.

A projection unit is provided with a transparent or partly transparent layer in the optical path of the projection unit, comprising a random or pseudo random structure, and an illumination with at least two light sources which shine through the structure or can illuminate it and thereby provide different patterns.

In this case the transparent or partly transparent layer here is a body with a slight surface waviness or surface roughness, preferably a thin wavy pane of glass.

A locally differently transparent mask is provided in the form of a pseudo random pattern which can be changed through electrical control.

One or a plurality of projection units is/are provided, each comprising at least two closely neighboring, approximately point or line shaped light sources whose cones of light emit different brightness patterns.

A projection unit is provided with two superimposed patterns movable to each other, with at least one having a pseudo random structure.

A projection unit is provided with two superimposed grating patterns movable to each other, with the phase and/or the frequency varying in a pseudo random manner with at least one of them.

A projection unit is provided with a random or pseudo random structure which can be moved rotatorily or translatorily.

A projection unit is provided which comprises a mask which includes a transparent vessel in which stochastically partially transparent or opaque particles are moving.

A projection unit is provided with at least one approximately point- or line-shaped light source whose cones of light emit brightness patterns with constant pseudo random patterns, with the light sources being movable by vibration.

A slot of light moving over the scene is provided, the brightness of this slot being modulated in a random or pseudo random manner.

The invention exhibits many advantages versus the prior art:

The method also works for colored objects, even with high color saturation (which is a problem in the coding with color patterns, see "Review of 20 years of range sensor development", Journal of Electronic Imaging, 13 (1): 231-240, January 2004, National Research Council Canada).

Only two images with standard cameras are required for the creation of a complete range image.

In the classic stereo method, the correspondence can only be calculated at brightness discontinuities, e.g. on object edges. This limitation does not apply to the method presented here; a complicated image analysis for the determination of image elements (edges, corners, blobs, etc) is unnecessary for correspondence finding.

A major advantage of the method is the fact that local discontinuities of brightness—due to coloration, printing, dirt, cavities, markings, machining marks, oil film and the like—are irrelevant (they can possibly be even helpful for correspondence finding). This also applies for natural structures such as they appear e.g. in textiles.

The above described problem of the division by small numbers (dark surface section and little brightness) is of less importance here insofar as—due to the random structure—it can only apply to small local areas, which is why only minor disparity errors will result from it upon finding the correspondence.

A technical application advantage is that the illumination need not be calibrated. Thus, on the one hand, a unit can be used, with firmly connected pre-calibrated stereo cameras; on the other hand, one or a plurality of illumination units can be used, consisting of one or a plurality of projection units which are mountable in the room depending on the task at hand (accessibility, avoiding glancing angles and shadows) without any illumination to calibration and without the strict requirement of a sharp image of the random patterns; the illumination units only need to roughly "hit" the objects.

Reliable range images, such as they are produced with the method according to the invention, are principally easier to analyze than gray scale images. Moreover, they are more clearly in parameterization for the user, i.e. with the invention, the user need not consider the sometimes complex nexus between illumination geometry, imaging geometry and reflection properties.

Compared with the so far known technique, the method according to the invention is considerably more insensitive to different surface properties, such as local inclination, roughness, printing, contamination, machining marks, etc. With the new sensor, areas of different reflection clubs are reliably and quickly recorded as a height image.

The method is suitable for many classic application areas, such as the metal industry or the electrical appliances industry; it is also suitable for a multitude of alternative fields of application, such as archeology (advantage of the omission of mechanically moving parts, e.g. laser scanner, as well as easier handling and transporting of the device); textile industry; biometry (e.g. for face recognition which is easier to realize with range images than with gray scale images), medicine, or reverse engineering. In the textile industry, folding, for example, can be reliably detected and assessed independent of color patterns.

Shading problems, such as they principally occur with stereo cameras, can be prevented or at least reduced by means of more than two cameras. Of course, in addition to these methods, the available cameras can also be used for conventional gray scale or color analysis.

BRIEF DESCRIPTION OF THE DRAWINGS

Additional details and advantages of the invention will be explained in detail on the basis of exemplary embodiments with reference to the enclosed drawings. The features described can be used alone or in combination to create preferable embodiments of the invention. The Figures show.

DETAILED DESCRIPTION

Several embodiments according to the invention are described below on the basis of FIGS. 1 to 11; generally, those without mechanically moving components are preferred.

Figure 1:
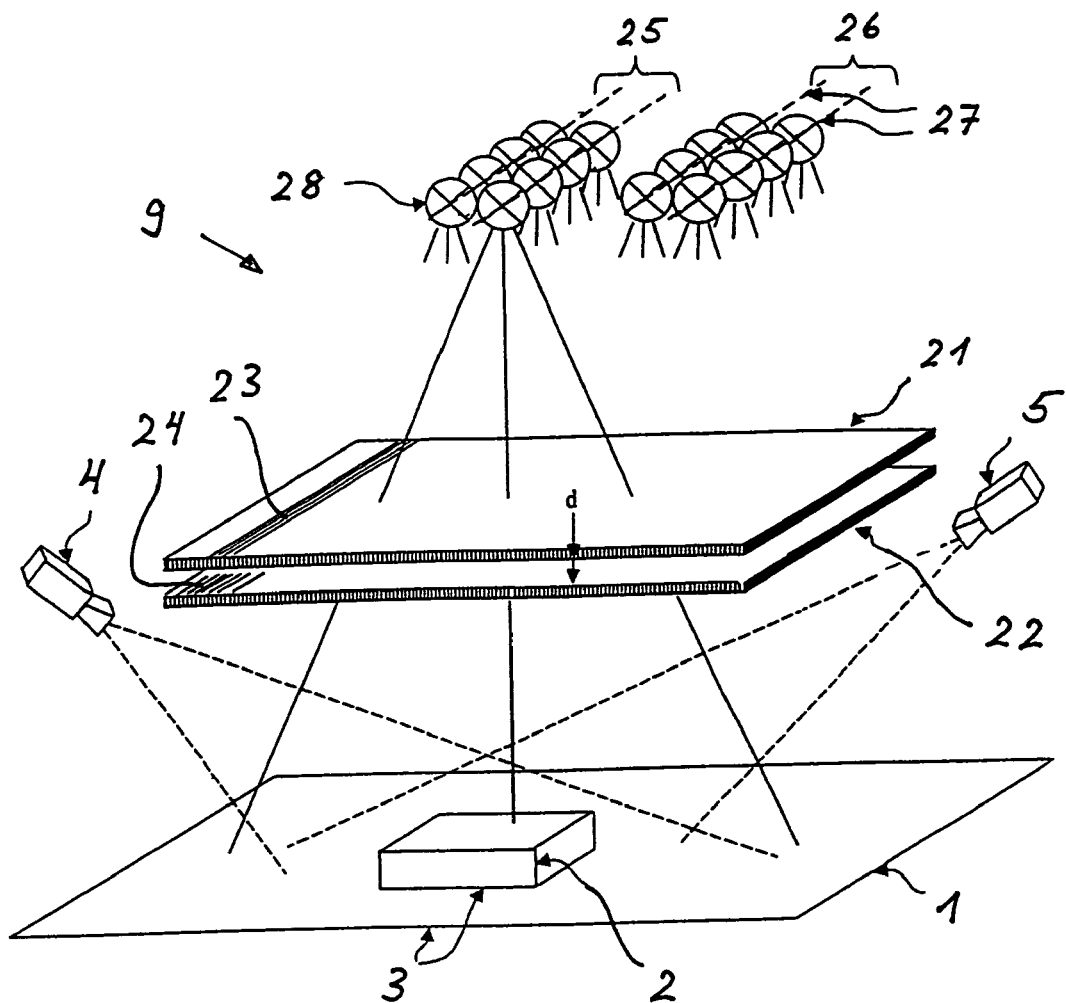
FIG. 1 a first device according to the invention with two gratings and line light sources.

FIG. 1 shows such a preferred embodiment without movement of parts. As explained below in FIG. 8, the random patterns are here realized in moiré technique by superposition of two optical gratings 21, 22, with the grating constant varying in a pseudo random manner with at least one grating. According to the invention, the gratings 21, 22 have a distance d to each other so that with illumination from different directions different moiré patterns result, without a mechanical movement of the gratings 21, 22 being required.

In the example in FIG. 1, the strip grating structures 23, 24 are roughly arranged transversely to the epipolar lines so that the moiré random patterns also run roughly transversely to the epipolar lines. In the example, the mask of the top grating 21 is uniformly structured; the mask of the bottom grating 22 is pseudo randomly structured. The scene is illuminated by a projection unit which comprises two approximately point or line light sources, or line light sources which are obtained by combining point light sources. FIG. 1 shows two light sources 25, 26, each consisting of two rows 27 of point light sources 28, e.g. LEDs which together form approximately line light sources 25, 26; they are advantageously aligned at least approximately like the strip grating structures 23, 24.

The scene in FIG. 1 comprises a base 1 on which a workpiece 2 is lying. Base 1 and workpiece 2 are called object 3 for short. The height of the surface points of base 1 and workpiece 2, in short the object points, is to be determined. The scene can of course also consist of only one section of a workpiece 2. The scene is viewed via two stereo cameras 2 and illuminated with the line light sources 25, 26 through the gratings 23, 24.

For the creation of two different pseudo random patterns on the object 3, the rows 27 of each projection unit or, respectively, of a line light source 25, 26 are each individually switched on. Different patterns are thereby created in the scene. The great advantages of this approach are that: a) no movement is required; b) the patterns created are drastically different; c) the light nonetheless effectively comes from nearly the same solid angle (important, see above) and d) the characteristics of the pseudo random patterns can be adjusted to the application.

With a plurality of projection units or, respectively, line light sources 25, 26 as shown in FIG. 1, an (again other) pair of pseudo random patterns can be additionally created with the same gratings 23, 24 which, however, upon illumination with the other light source, develops from a deliberately chosen different spatial direction. Thus, another independent analysis with a fusion of the results can be realized, as described above for different illumination units. See also the advantages mentioned there.

The arrangements are preferably made such that the random patterns in the image run roughly along the epipolar lines; transversely thereto, it is rather favorable if there are only minor brightness variations (important with inaccurate camera calibration).

Figure 14:
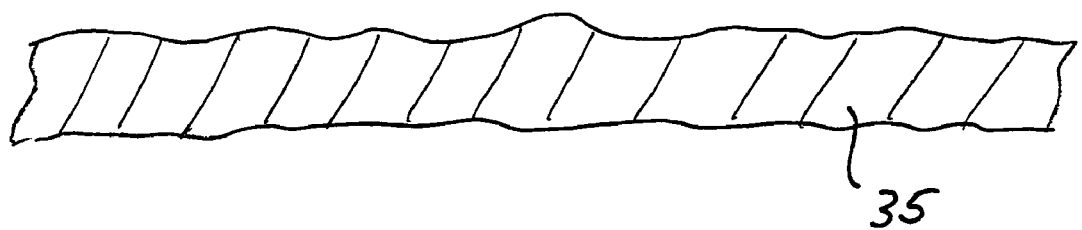
FIG. 14 a modified detail of FIG. 1.

In variations to the gratings 21, 22 used in FIG. 1, a projection unit can generally be used with a transparent or partly transparent layer in the optical path of the projection unit which comprises a random or pseudo random structure, and an illumination with at least two light sources which can shine through the structure or illuminate it, thereby providing different patterns. In FIG. 14, such a transparent or partly transparent layer is presented, for example, as a body with a slight surface waviness or surface roughness, preferably in the form of a thin wavy pane of glass 35. The surface waviness in the presented cross-section of the pane of glass 35 has been exaggerated for the purpose of illustration; as a rule, the normal production-specific surface waviness of standard commercial glass will be adequate.

Figure 2:
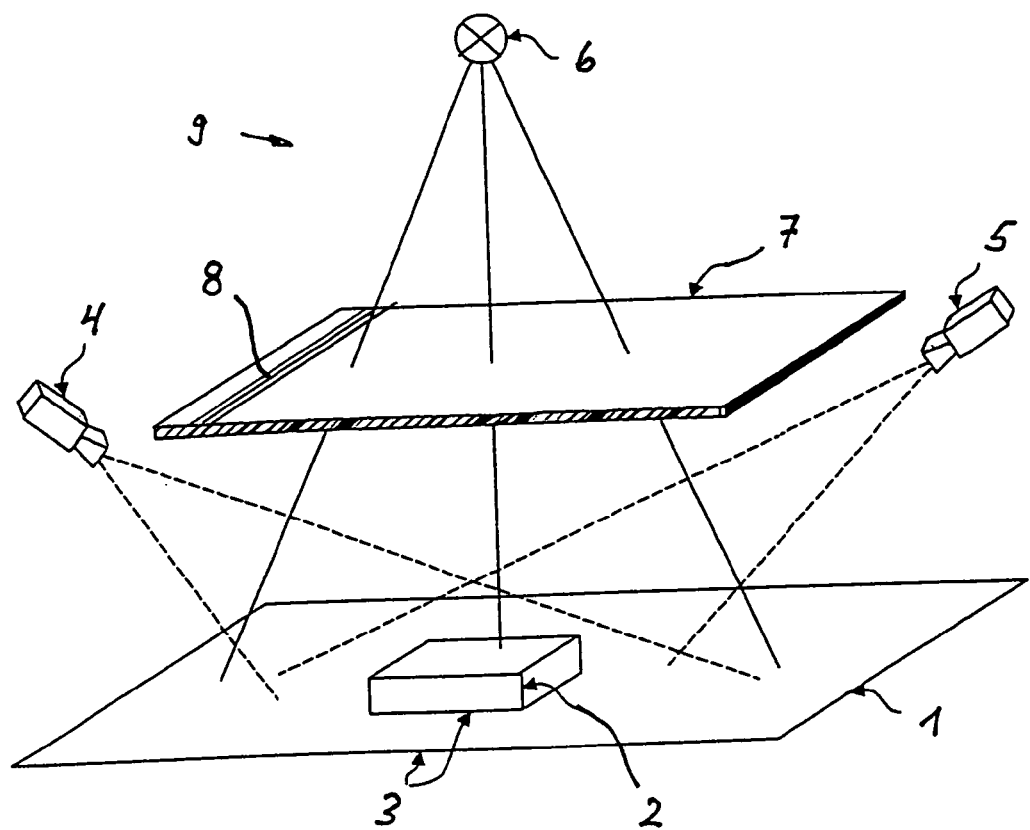
FIG. 2 a second device according to the invention with a mask and a point light source.

FIG. 2 shows a variation of FIG. 1. Here, the scene with the object 3 is illuminated by an approximately point light source 6. In the illumination optical path, a mask 7 is provided in the form of a pseudo random pattern which is locally differently transparent. The pattern preferably consists of strips 8 which roughly run in the images transversely to the epipolar lines. The structure of the mask 7 can be changed by electrical control, as known e.g. from liquid crystal displays; in this is manner, different strip patterns 8 can be realized with the known display technique. It is thus also possible to realize different intertwined color patterns.

Figures 3, 4:
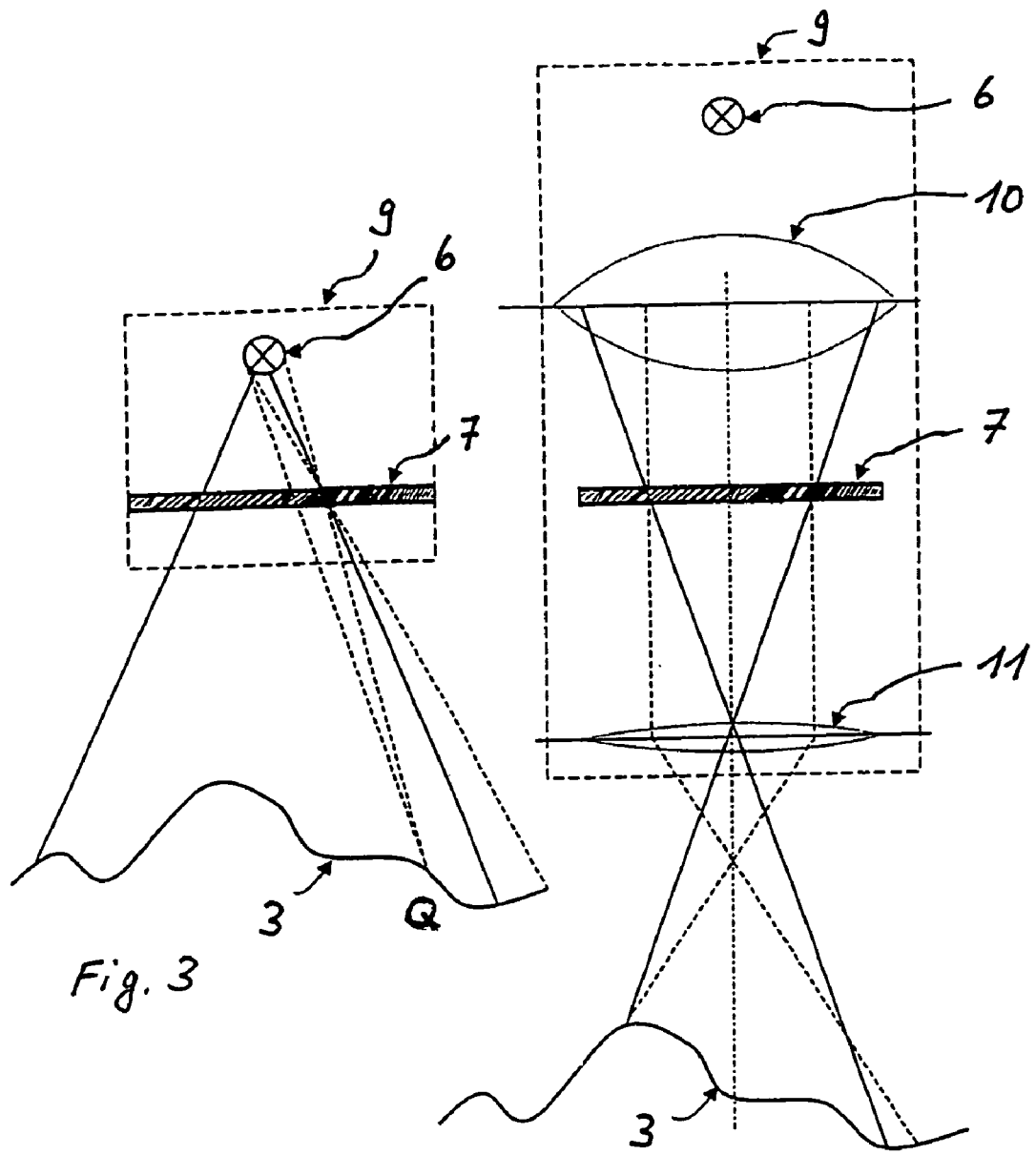
FIG. 3 a detail of the projection unit of FIG. 3.
FIG. 4 a variation of FIG. 3.

In the exemplary embodiment according to FIG. 2, the light source 6 should be as point-shaped as possible to prevent excessive superposition of rays of different intensity. FIG. 3 shows clearly how, otherwise, with an extended light source 6, light and dark places can be superposed in the projection at an object point Q. However, a certain amount of smearing (blurring) of the imaged pattern principally does not matter.

FIG. 4 shows an improvement of the projection unit 9 in which, by classic imaging with a condenser 10 and a lens 11, a sharper pattern is projected onto the scene 3. Here again, however, care should be taken to use the smallest possible aperture (depth of focus). The projection unit 9 in FIG. 2 thus consists of illumination (light source 6) and a controllable mask 7, if necessary with condenser 10 and lens 11. In FIG. 1, a corresponding projection unit 9 comprises the components there presented.

Figure 5:
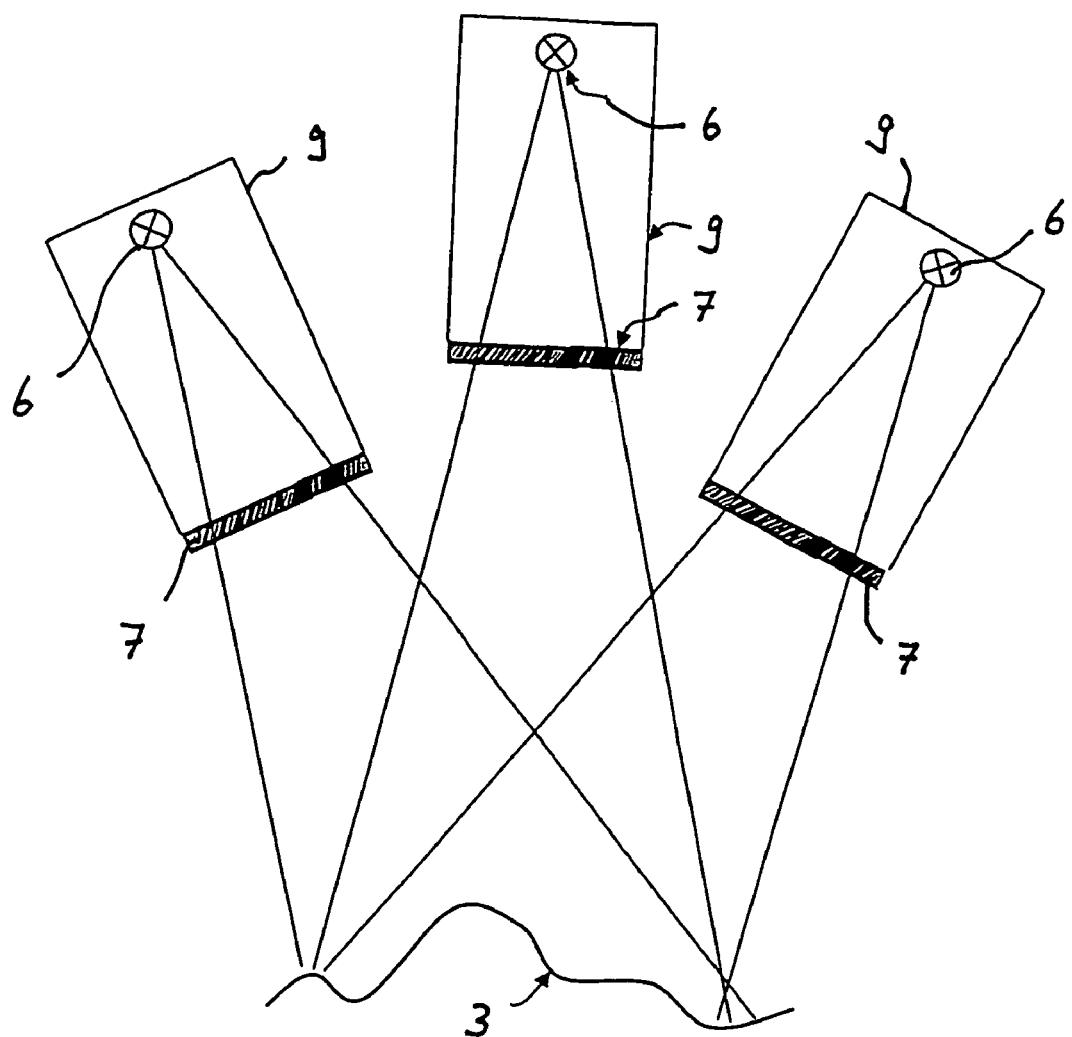
FIG. 5 the illumination of a scene with a plurality of projection units.

It is, of course, possible to work consecutively with a plurality of projection units 9 and merge the results (local averaging or selection due to quality measures); if they are to be simultaneously active, care must be taken—as shown in FIG. 5—that the patterns respectively projected by the light units 9 coincide in the best possible manner; otherwise, there will be—as in FIG. 4—a superposition of light and dark places of the patterns on the object 3.

Figure 6:
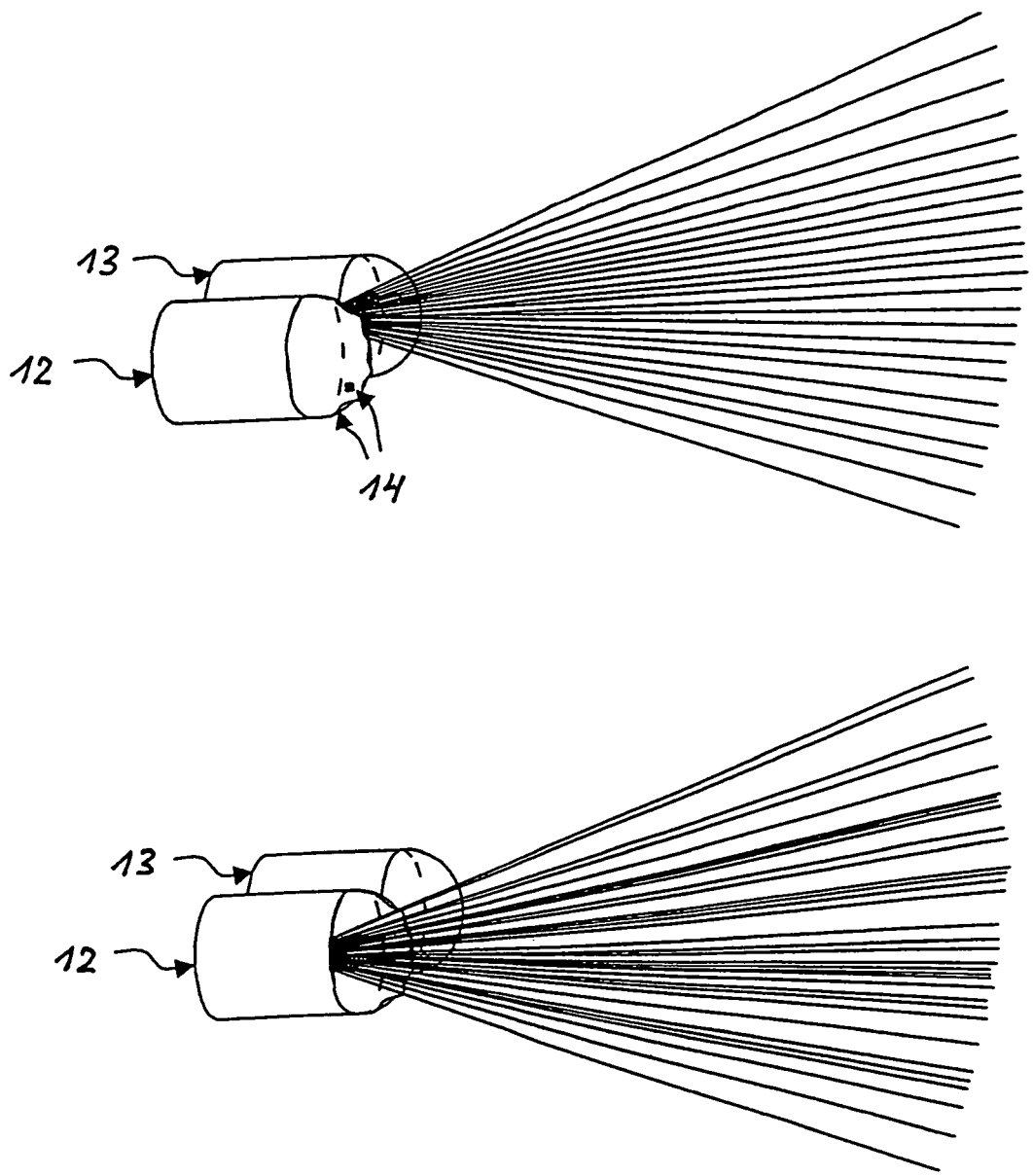
FIG. 6 two neighboring point light sources with structured cone of light.

FIG. 6 shows an arrangement in a projection unit in which two approximately point-shaped light sources 12, 13—e.g. LEDs—are arranged closely neighboring each other, with the cones of light of the LEDs 12, 13 emitting different brightness patterns so that the light sources 12, 13 show a structured cone of light. In the production of LEDs, it is endeavored to obtain the most to homogeneous cones of light possible; however, more or less random inhomogeneous structures result due to irregularities of the surfaces (lens effects), material inclusions, air bubbles, deviations in geometry, etc. These "dirt effects" 14 can be used to project random patterns. Such effects can, of course, also be partly intentionally brought about by specific production or processing of the light sources 12, 13. Instead of dirt effects, the same effect can also be achieved by adding a correspondingly structured mask 7.

The two LEDs 12, 13 in FIG. 6 now project, on the one hand, different random patterns; on the other hand, however, due to their spatial proximity, they project from approximately the same solid angle. In FIG. 6, the front LED 12 has a highly structured cone of light, the rear LED 13 has a homogeneous cone of light. The projection unit 9 here consists of the two LEDs and, if necessary, a mask 7. In the lower part of FIG. 6, the front LED 12 is switched on, and in the upper part of FIG. 6, the rear LED 13 is switched on.

Figure 7:
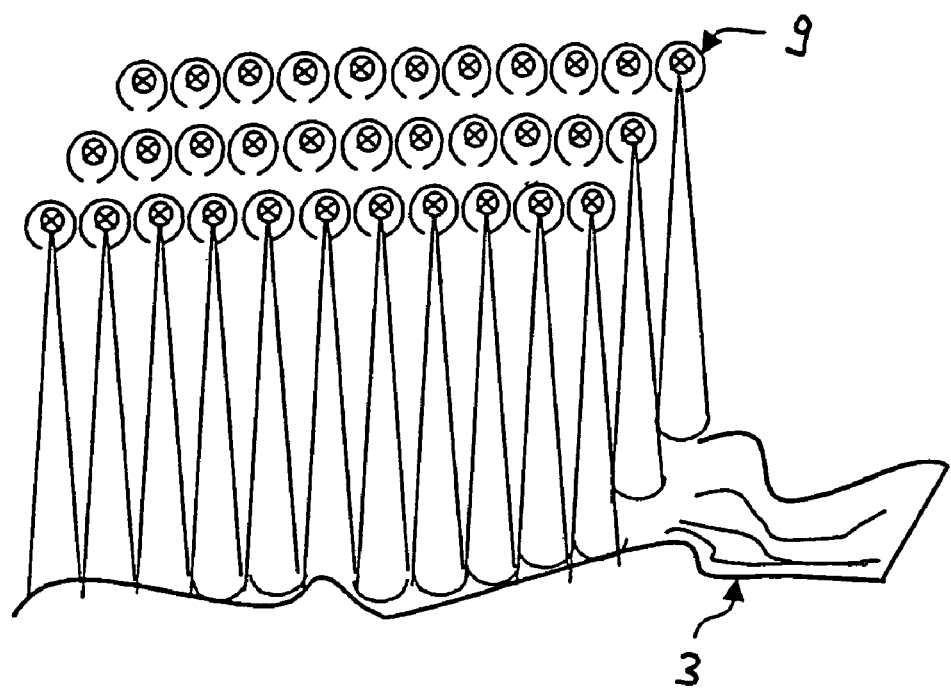
FIG. 7 embodiments of devices according to the invention with a plurality of projection units.
Figure 7:
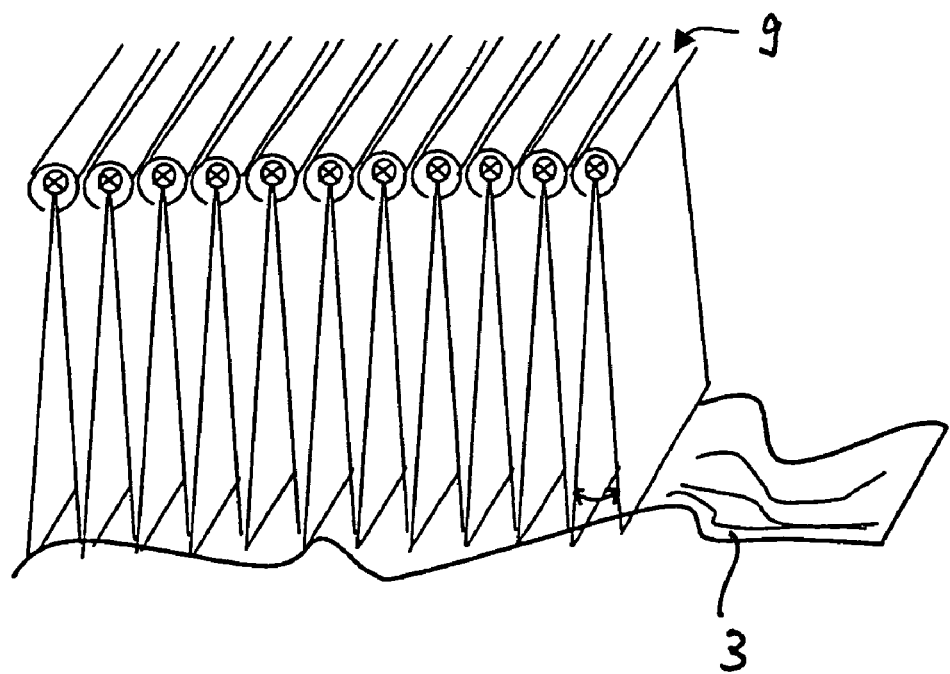

FIG. 7 illustrates embodiments with a plurality of projection units 9. It is essential that the cones of light of the projection units 9—if they are simultaneously switched on—will either not or only slightly be superposed, or that they are adjusted to each other according to FIG. 5. Line projection units 9 according to the lower part of FIG. 7 should be generally oriented transversely to the epipolar lines; as mentioned above, the random patterns in the image should run roughly along the epipolar lines and have only minor brightness variations transversely thereto.

Figure 8:
FIG. 8 a moiré pattern with two regular gratings.
Figure 8:
Figure 8:
Figure 8:
Figure 9:
FIG. 9 a moiré pattern with pseudo random gratings.
Figure 9:
Figure 9:
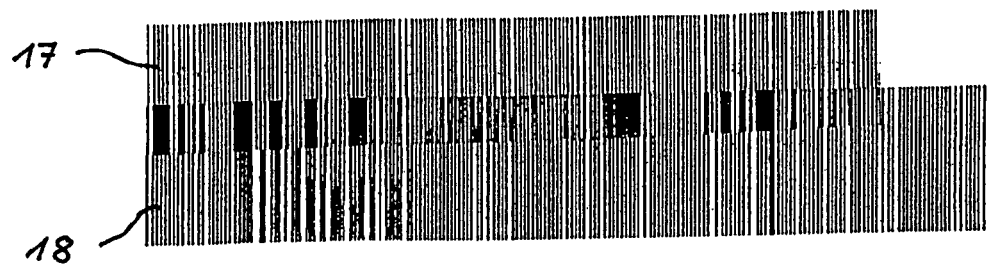
Figure 9:
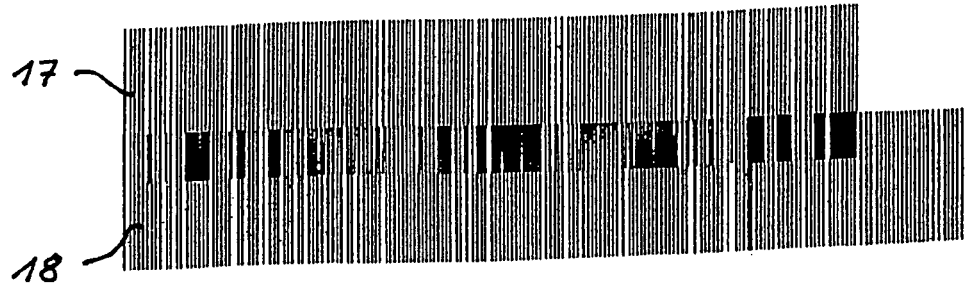

FIG. 8 illustrates the moiré principle used in the embodiment according to FIG. 9. On the top, FIG. 8 shows a regular grating 15; underneath, it shows another regular grating 16 with a slightly deviating grating constant. Due to the superposition of gratings 15 and 16, the interference or, respectively, superposition pattern arises which is presented in the center of FIG. 8. A minor shift of the gratings 15, 16 against each other roughly modifies the phase of the interference pattern, with the pattern presented in the center of FIG. 8 being changed to the pattern presented on the bottom of FIG. 8. FIG. 9 shows four double rows, wherein, in each case, two gratings are superposed. The top double row presents the superposition of a uniform grating 15 with a grating 17 which, versus grating 15, has pseudo random deviations of the local grating constant. Superposition of the gratings 15 and 17 results in a corresponding pseudo random pattern. Technically interesting is that due to a very small change of the relative position of the gratings 15, 17, a rough change in the pseudo random interference pattern arises which, for example, results in the pattern presented in the second double row of FIG. 8. Thus, a very small movement of a grating 15 or 17—e.g. by piezo elements—can create rough changes in pseudo random patterns.

The third and the fourth double row in FIG. 9 show the same principle, with two different pseudo random patterns being superposed by gratings 17, 18 of the same or nearly the same grating constant where phase skips by 180 degree are provided at random places (preferably such that no two opaque bars may follow each other). A very small mutual shift of the gratings 17, 18 from the third double row in FIG. 9 results, for example, in the highly changed superposition pattern presented in the fourth double row. A slight twist of the patterns or, respectively, gratings against each other results in a moiré transversely to the desired moiré; this, however, is "long-wave" and thus not interfering.

Figure 10:
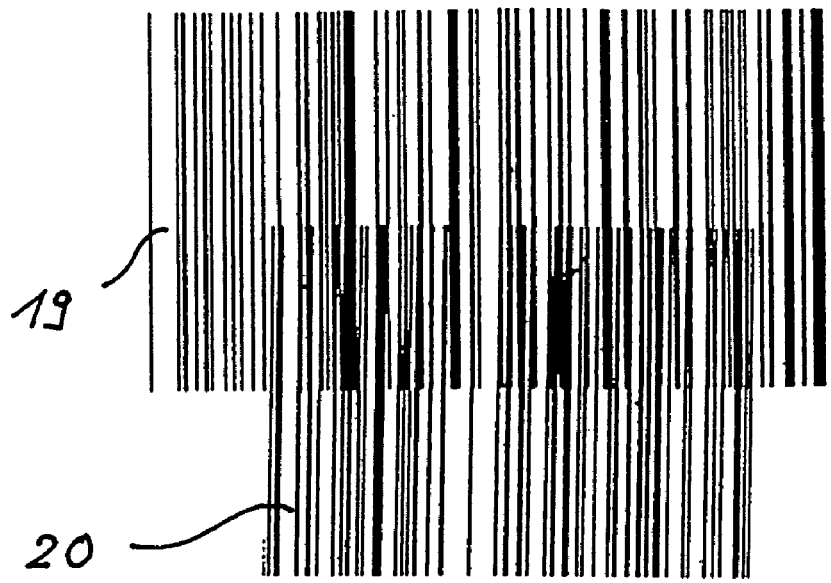
FIG. 10 a superimposing pattern with pseudo random bar patterns.
Figure 10:
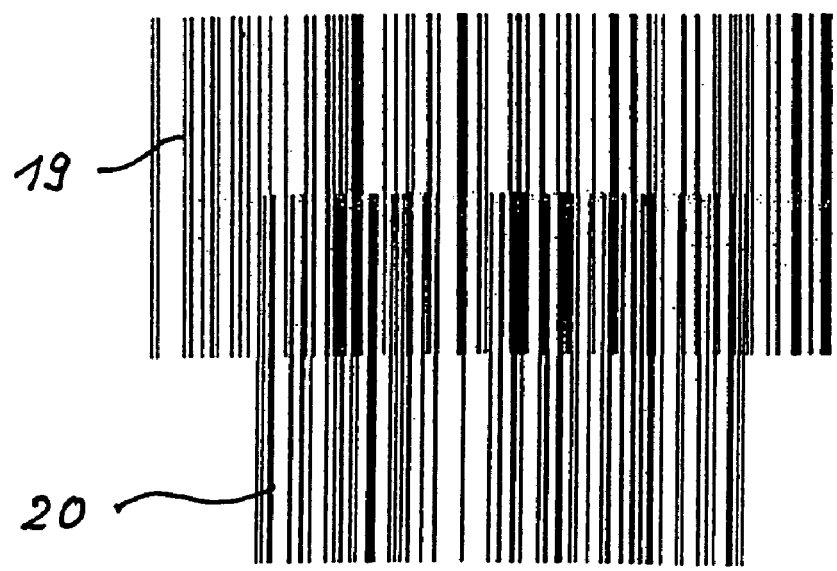

FIG. 10 shows additionally that even with a superposition of simple, pseudo random bar patterns 19, 20, differing random patterns can be generated by a shift. In the lower double row in FIG. 10, the relative position of the two patterns 19, 20 is changed versus that in the top double row. However, a larger relative shift of the gratings 19, 20 to each other is here required than with the moiré technique; accordingly, the moiré technique is preferred.

Figure 11:
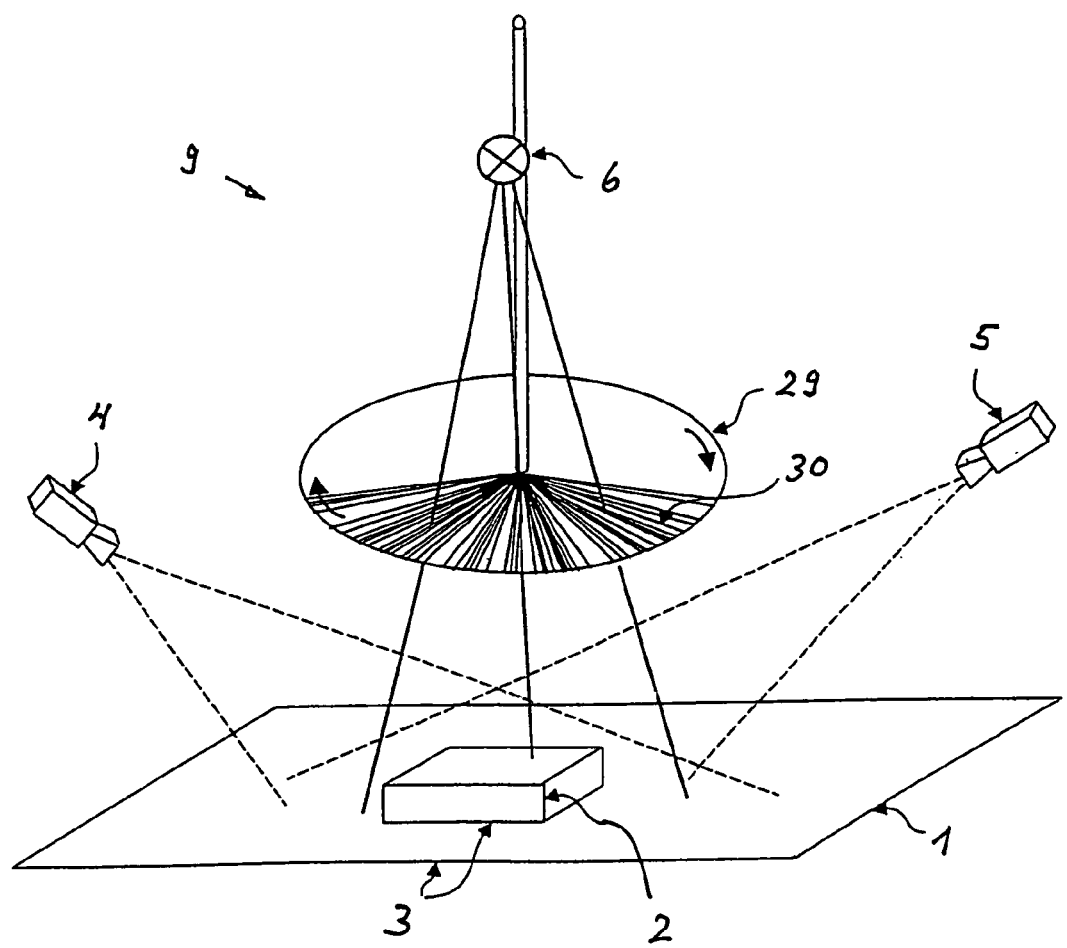
FIG. 11 a variation of FIG. 2.

FIG. 11 shows an embodiment modified versus FIG. 2 in which a movable mask 29 with a fixed pseudo random pattern 30 is used, i.e. locally differently transparent with a random or, here, pseudo random structure. The mask 29 moves in the light cone of the point light source 6, for example rotatorily, as presented. The two images to be taken of the object 3 by the method according to the invention are made at different points in time in such a manner that they are effectively done with different illumination patterns. In FIG. 11, the mask 29 is particularly turned; of course it can just as well oscillate linearly or rotatorily. For taking the images, care must only be taken that they are exactly simultaneously for both cameras 4, 5 and occur with the same integration intervals. This prerequisite is not necessary if the mask 29 can assume two discrete fixed positions by means of a mechanic equipment.

The described embodiments according to the invention—with transilluminated patterns, including moiré-forming patterns—of course also apply analogously to the corresponding embodiments with incident light with locally differently reflecting mirror surfaces, instead of transmitted light.

Figure 12:
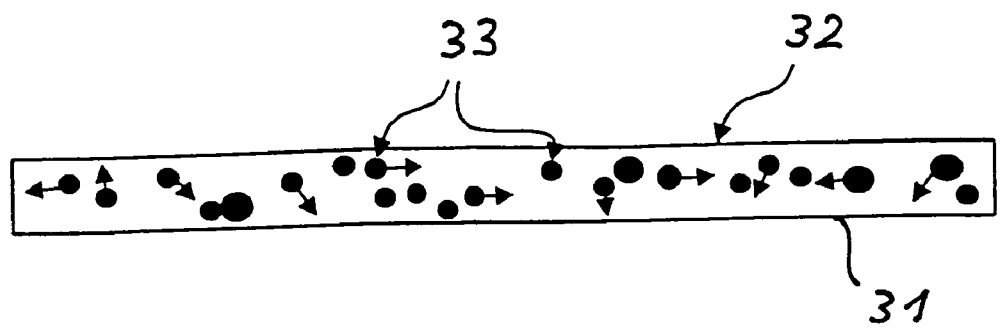
FIG. 12 a mask with stochastically moving particles.

Within the scope of the invention, FIG. 12 shows a mask 31 which can be used for the creation of a random pattern and is formed by a transparent vessel 32 in which stochastically partially transparent or opaque particles 33 are moving, e.g. in a liquid. Such an arrangement could play a part e.g. in microscopy. Here again, care must be taken that the images taken according to the invention are synchronized with each other.

Of course, the embodiments according to FIGS. 11 and 12 as well as that according to FIG. 2 can be supplemented by the classic projection arrangement with a condenser 10 and lens 11 (see FIG. 4). This also applies for the arrangement according to FIG. 1, with the focus level provided between the two patterns 23, 24. In this case care is taken that with the two images taken, the effective light source (analog to the aperture diaphragm of a camera arrangement) of the projection arrangement 9 comes to lie via a suitable optical path at two slightly different places (e.g. with two laterally displaced light sources in front of the condenser 10; the light source being usually imaged in the imaging lens).

A further embodiment, not shown in the Figures, of a device according to the invention with moving components consists of moving illumination elements with a random or pseudo random structured cone of light—e.g. such as the light source 12 presented in FIG. 6 with brightness patterns, which are arranged as shown in FIG. 7—e.g. by vibration of the attachment and, if necessary, additionally through flexible mounting of the illumination elements.

Figure 13:
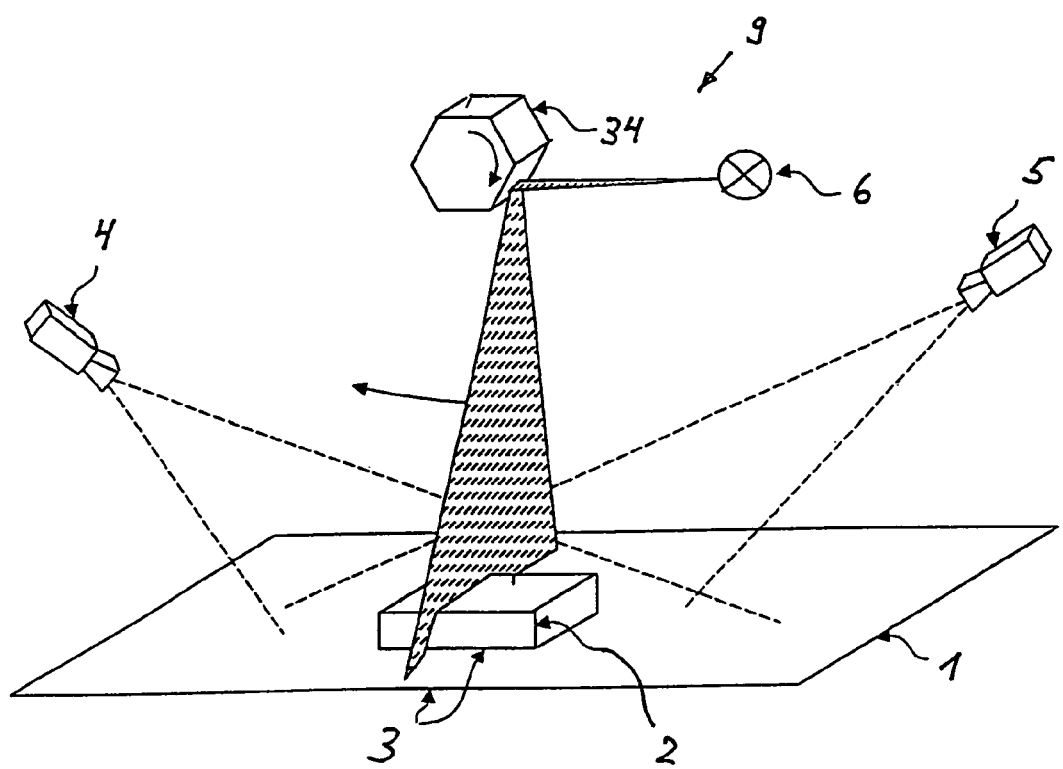
FIG. 13 a third device according to the invention with a scanner.
Figure 15A:
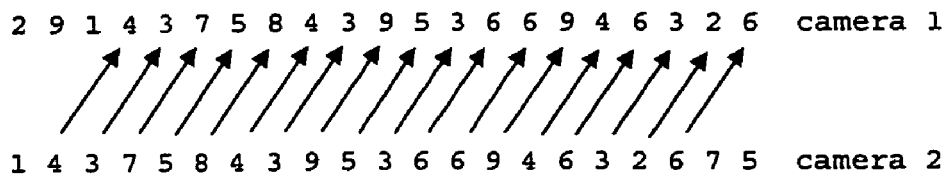
FIG. 15 allocations with quasi random sequences.
Figure 15B:
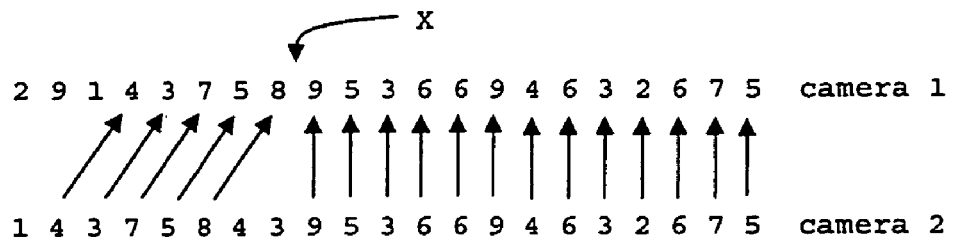
Figure 15C:
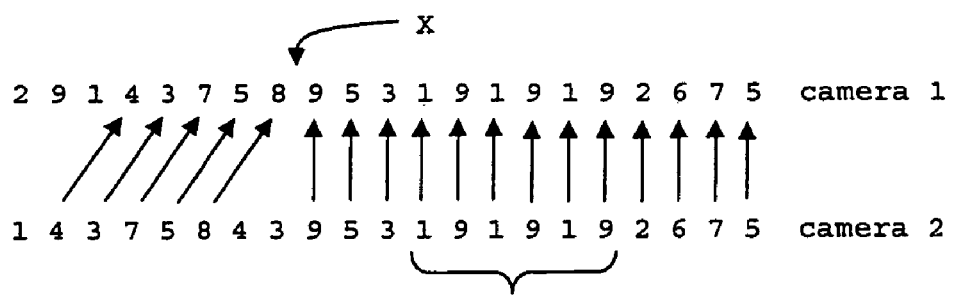
Figure 15D:
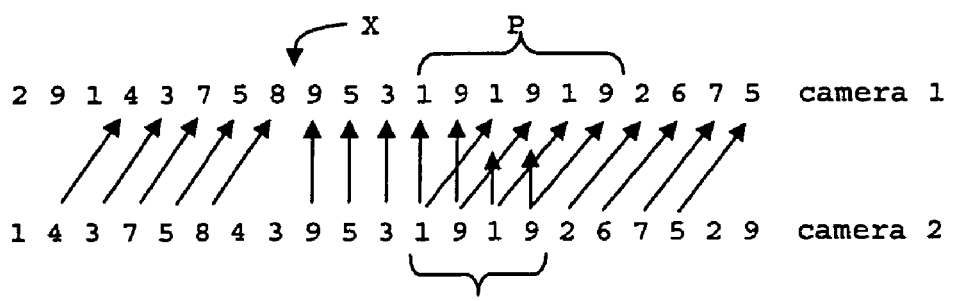
Figure 16A:
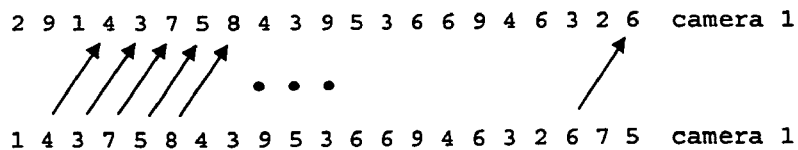
FIG. 16 allocations with diagonal strip patterns.
Figure 16B:
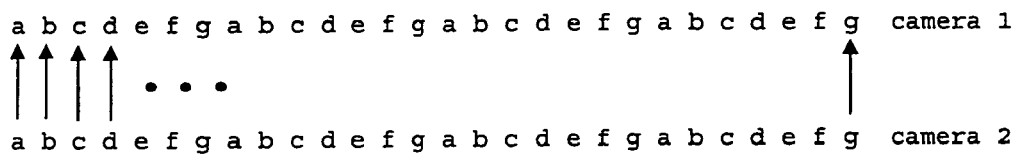
Figure 16C:
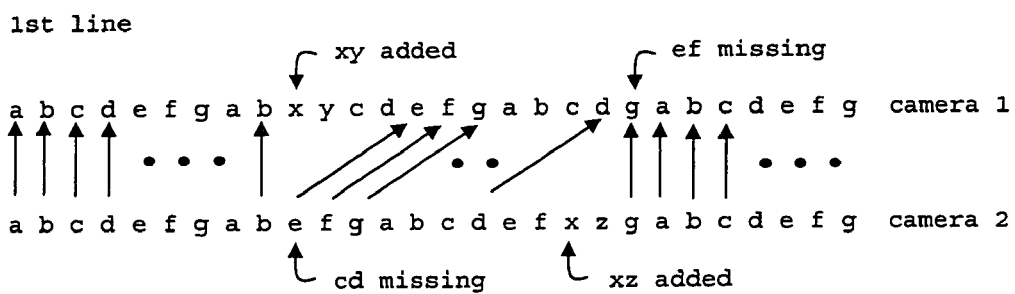
Figure 16D:
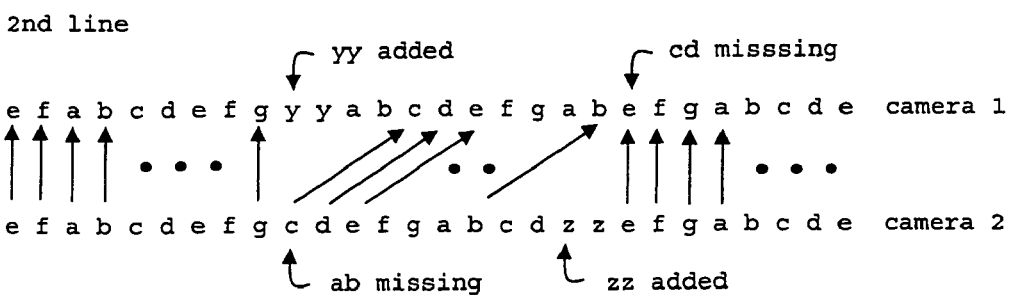
Figure 16E:
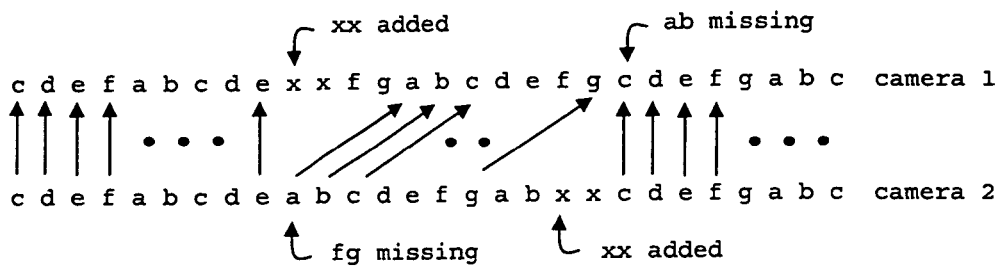

FIG. 13 shows an embodiment of a device according to the invention in accordance with the devices from FIGS. 1 and 2, but with a scanner used as the light source. Here, the light of a light source 6 or, respectively, a slot of light is projected onto a deflection unit 34—which is, in FIG. 13 for example, a rotating polygon—and from there onto the scene 3. The light source 6 is here, for example, a laser light source with a cylinder lens for widening the beam (not drawn in), as is usual for laser scanners. The light source 6 is brightness-modulated in a random or pseudo random manner. The integration time of the cameras 4, 5 and the deflecting speed are adjusted such that—within an integration interval—the scene 3 is swept over in the range which is of interest. Two images are realized per camera 4, 5. The cameras 4, 5 need not be coordinated with the deflection unit 34. This is an advantage versus the above described solution in accordance with U.S. Pat. No. 6,600,168. The random generator producing the random pattern in the brightness modulation does not need to be synchronized either with the cameras 4, 5 or with the deflection unit 34.

The method according to the invention works, for example, with stereo cameras 4, 5 and a strip light projection with a quasi random pattern which is projected with an uncalibrated beamer. For each camera 4, 5, exactly two differently illuminated images are taken; subsequently, a pixelwise quotient is obtained of both images. The resulting quotient image is entirely independent per se from the surface properties of the object and the direction of the surface normal: Determination of the corresponding points (the main problem in stereo analysis) is very significantly facilitated thereby.

The specific strip pattern as the quasi random sequence is a key here; reliable stereo analysis is realized thereby with only two images; series of images are unnecessary—as required with coded light. Due to the quotient formation, the system achieves its comparatively better insensitivity versus different surface properties, such as local inclination, roughness, printing etc. No mechanical movement of the metrological system is required. The beamer's resolution is uncritical; it does not need a high resolution like the cameras.

For the realization with color, the first and the second illumination are provided with different colors, preferably simultaneously, and the image is taken with color cameras to separate the color channels.

For the realization with polarization, the first and the second illumination is provided with a different polarization, preferably simultaneously, and when the image is taken, the channels are separated by beam splitters (e.g. beam-splitting prisms, semi-transparent mirrors) and downstream polarization filters.

For separation of the two illuminations, color and polarization are actually possible but not preferred; color due to the above-cited problems in color analysis; polarization due to possible viewing angle-dependent polarization effects, especially on non-metallic surfaces (in the vicinity of the Brewster angle).

Figure 17:
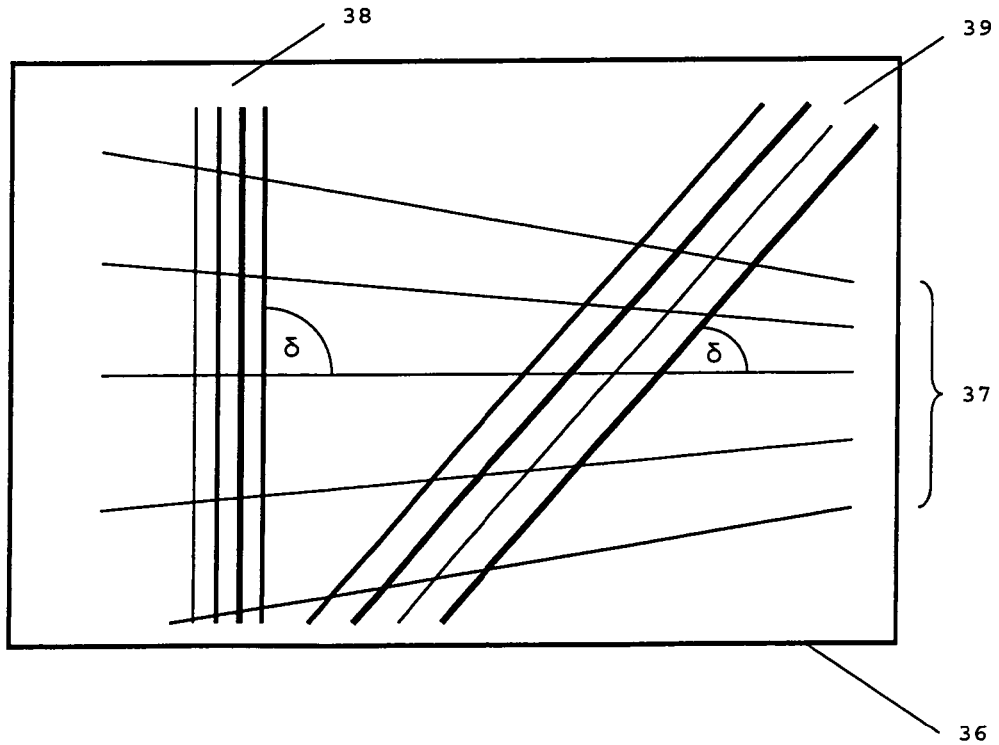
FIG. 17 projection strips transversely and diagonally aligned to epipolar lines.

FIG. 17 illustrates a particularly advantageous embodiment in which the scene is illuminated with a random or pseudo random pattern which is essentially locally modulated in a first spatial dimension and essentially not or only slightly modulated in the second spatial dimension. Thus, a strip pattern is essentially projected, and the comparison of the modulation feature ratios is done to allocated epipolar lines of different cameras, with the second spatial dimension of the random or, respectively, pseudo random pattern not aligned transversely but diagonally to the epipolar lines.

Presented is an image field 36, taken by a camera, of a scene in which epipolar lines 37 are running. These are arranged in parallel or at an angle to each other. The scene is illuminated with projection strips. When the projection strips 38 are transversely projected, thus perpendicular to the epipolar lines 37, the angle δ is between 70° and 90°. When the projection strips 39 are diagonally projected to the epipolar lines 37, the angle δ is between 30° and 70°. In cases in which the epipolar lines 37 are not running parallel, a mean direction of the epipolar lines 37 applied in the part of the image field 36 taken by the camera and actively to be analyzed, i.e. that part in which the scene to be analyzed or, respectively, the object is located.

The diagonal projection renders it possible that—in the analysis of the image information for the creation of the range image—allocations of different values are included which belong to the same object point but come from different epipolar lines which are neighboring or arranged closely to each other. In this way it stabilizes the analysis of the image information for the creation of the range image.

LIST OF REFERENCE NUMERALS

1 Base
2 Workpiece
3 Object
4 Camera
5 Camera
6 Point light source
7 Mask
8 Strip
9 Projection unit
10 Condenser
11 Lens
12 Light source with brightness pattern
13 Light source with brightness pattern
14 Dirt effect
15 Regular grating
16 Regular grating
17 Pseudo random grating
18 Pseudo random grating
19 Pseudo random bar pattern
20 Pseudo random bar pattern
21 Grating
22 Grating
23 Grating structure
24 Grating structure
25 Line light source
26 Line light source
27 Row
28 Light source
29 Movable mask
30 Pseudo random pattern
31 Particle mask
32 Vessel
33 Particle
34 Deflection unit
35 Pane of glass
36 Image field
37 Epipolar lines
38 Projection strips, transverse
39 Projection strips, diagonal δ Angle
d Distance
P Period
Q Object point

What is claimed is:

1. Method for the acquisition of a range image of a scene from the correspondence of pixels of the images of a first camera and at least one second camera which record the scene in stereo arrangement, the method comprising:
    illuminating the scene in a first illumination with a random or pseudo random pattern which is designed, with regard to at least one modulation feature in at least one spatial dimension, as a random sequence or, respectively, pseudo random sequence;
    in the first illumination, a first image is taken by at least two cameras;
    illuminating the scene in a second illumination, wherein a second image with the second illumination is taken by the at least two cameras;
    calculating a ratio for at least two cameras, pixel-wise from the first and the second image taken by the corresponding camera in which a modulation feature value of the pixel from the one image is placed in the numerator, and the modulation feature from the other image is placed in the denominator of the ratio value; and
    determining the correspondence of pixels of the scene on the basis of a comparison of the modulation feature ratios of pixels from different cameras.

2. Method according to claim 1, wherein in that the modulation feature is the brightness or, respectively, the intensity of the illumination and the modulation feature ratio is a brightness or, respectively, intensity ratio.

3. Method according to claim 1, wherein the modulation feature is a color parameter of the illumination and the modulation feature ratio is a color value ratio.

4. Method according to claim 1 wherein in forming the modulation feature ratio—an offset value is added to or subtracted from the modulation features set into a ratio.

5. Method according to claim 1 wherein the random or, respectively, pseudo random pattern is essentially locally modulated in a first spatial dimension and essentially not modulated or only slightly modulated in the second spatial dimension.

6. Method according to claim 5 wherein the random or, respectively, pseudo random pattern is essentially modulated along the epipolar lines.

7. Method according to claim 6, wherein a second spatial dimension of the random or, respectively, pseudo random pattern is oriented transversely to the epipolar lines.

8. Method according to claim 6, wherein a second spatial dimension of the random or, respectively, pseudo random pattern is oriented diagonally to the epipolar lines.

9. Method according to claim 1 wherein the first and the second illumination taking the first and the second image are performed at least approximately from the same solid angle.

10. Method according to claim 1 wherein correspondence is obtained by a comparison of the values of a piecewise, one-dimensional, standardized correlation of the modulation feature ratios along the epipolar lines.

11. Method according to claim 1 in that the first and the second illumination are provided with different colors, preferably simultaneously, and that color cameras are used.

12. Method according to claim 1 wherein the first and the second illumination are provided with a different polarization, and in that the channels, upon taking the image, are separated by beam splitters and downstream polarization filters.

13. Device for the acquisition of a range image of a scene comprising at least two cameras in stereo arrangement, at least one image analysis unit for analyzing the camera pictures and at least one projection unit for illuminating the scene, wherein:
    by means of the projection unit, at least two different illuminations can be projected onto the scene, of which at least one illumination is a random or pseudo random pattern which is designed, with regard to at least one modulation feature in at least one spatial dimension, as a random sequence or, respectively, pseudo random sequence;
    in the first illumination, a first image can be taken by at least two cameras;
    in a second illumination, the scene can be illuminated wherein a second image with the second illumination can be taken by the at least two cameras;
    for at least two cameras, a ratio can be calculated pixel-wise with the image analysis unit from the first and the second image taken by the corresponding camera, in which a modulation feature value of the pixel from the one image is placed in the numerator, and the modulation feature from the other image is placed in the denominator of the ratio value; and
    the correspondence of pixels of the scene can be determined on the basis of a comparison of the modulation feature ratios of pixels from different cameras.

14. Device according to claim 13 wherein at least two illuminations can be performed with a random or pseudo random pattern.

15. Device according to claim 13 wherein at least one random or pseudo random pattern is a brightness pattern.

16. Device according to claim 13 wherein a projection unit is provided with two superposed gratings which have a distance (d) to each other, wherein at least one grating has a random or pseudo random structure, and by an illumination with at least two light sources which shine through the gratings or can illuminate them and thereby provide different patterns.

17. Device according to claim 13 wherein a projection unit is provided with two superposed gratings which have a distance to each other, wherein at least for one, the phase and/or the frequency of the grating varies in a pseudo random manner, and by an illumination with at least two light sources which shine through the gratings or can illuminate them and thereby provide different moiré patterns.

18. Device according to claim 13 wherein a projection unit is provided with a transparent or partly transparent layer in the optical path of the projection unit, comprising a random or pseudo random structure, and by an illumination with at least two light sources which shine through the structure or can illuminate it and thereby provide different patterns.

19. Device according to claim 13 wherein the transparent or partly transparent layer is a pane of glass with a slight surface waviness or surface roughness.

20. Device according to claim 13 wherein the transparent layer is in the form of a pseudo random pattern which can be changed through electrical control.

21. Device according to claim 13 wherein the projection unit comprises a random or pseudo random pattern which can be moved rotatorily or translatorily.

22. Device according to claim 13, characterized in that a random or, respectively, pseudo random pattern is projectable on the scene, which is essentially locally modulated in a first spatial dimension and essentially not or only slightly modulated in the second spatial dimension.

23. Device according to claim 22, wherein the random or, respectively, pseudo random pattern is essentially modulated along the epipolar lines.

24. Device according to claim 22, wherein the second spatial dimension of the random or, respectively, pseudo random pattern is transversely aligned to the epipolar lines.

25. Device according to claim 22, wherein the second spatial dimension of the random or, respectively, pseudo random pattern is diagonally aligned to the epipolar lines.

* * * * *